United States Patent
Delia et al.

(10) Patent No.: US 10,202,297 B2
(45) Date of Patent: Feb. 12, 2019

(54) GLASS INLET TUBE ENVIRONMENTAL CONTROL

(71) Applicant: Corning Incorporated, Corning, NY (US)

(72) Inventors: Robert Delia, Horseheads, NY (US); Shawn Rachelle Markham, Harrodsburg, KY (US); Brandon Thomas Sternquist, Corning, NY (US); Nathan Tyler Qualls, Harrodsburg, KY (US)

(73) Assignee: Corning Incorporated, Corning, NY (US)

( * ) Notice: Subject to any disclaimer, the term of this patent is extended or adjusted under 35 U.S.C. 154(b) by 123 days.

(21) Appl. No.: 15/509,240

(22) PCT Filed: Sep. 25, 2015

(86) PCT No.: PCT/US2015/052118
§ 371 (c)(1),
(2) Date: Mar. 7, 2017

(87) PCT Pub. No.: WO2016/053773
PCT Pub. Date: Apr. 7, 2016

(65) Prior Publication Data
US 2017/0283294 A1 Oct. 5, 2017

Related U.S. Application Data

(60) Provisional application No. 62/056,943, filed on Sep. 29, 2014.

(51) Int. Cl.
*C03B 5/167* (2006.01)
*C03B 7/02* (2006.01)
(Continued)

(52) U.S. Cl.
CPC .............. *C03B 5/1675* (2013.01); *C03B 5/16* (2013.01); *C03B 5/43* (2013.01); *C03B 7/02* (2013.01); *C03B 17/064* (2013.01)

(58) Field of Classification Search
CPC ........... C03B 5/163; C03B 5/137; C03B 5/26; C03B 7/02
(Continued)

(56) References Cited

U.S. PATENT DOCUMENTS 3,416,908 A 12/1968 Goodwin et al.
3,988,139 A 10/1976 Goodwin
(Continued)

FOREIGN PATENT DOCUMENTS

| JP | 2004026518 A | 1/2004 |
| JP | 2008201617 A | 9/2008 |
| JP | 2012121779 A | 6/2012 |

OTHER PUBLICATIONS

PCT/US15/52118; International Search Report and Written Opinion; dated Sep. 25, 2015; 9 pages.

*Primary Examiner* — Cynthia Szewczyk

(57) ABSTRACT

A system and method are described herein for controlling an environment around an inlet tube in the glass manufacturing system. More specifically, the system and method control a level of hydrogen within a humid gas mixture that flows over an exterior of the inlet tube to effectively suppress the formation of undesirable gaseous inclusions in molten glass that flows through the inlet tube.

17 Claims, 5 Drawing Sheets

(51) Int. Cl.
*C03B 5/16* (2006.01)
*C03B 5/43* (2006.01)
*C03B 17/06* (2006.01)

(58) Field of Classification Search
USPC .................................. 65/128, 146, 157, 356
See application file for complete search history.

(56) References Cited

U.S. PATENT DOCUMENTS

| | | | |
|---|---|---|---|
| 4,011,070 A | | 3/1977 | Hynd |
| 4,365,987 A | * | 12/1982 | Boettner .................. C03B 5/20 |
| | | | 65/126 |
| 4,983,198 A | | 1/1991 | Ogino |
| 5,785,726 A | | 7/1998 | Dorfeld et al. |
| 5,820,652 A | * | 10/1998 | Bernard .................. C03B 5/005 |
| | | | 65/325 |
| 5,851,258 A | * | 12/1998 | Ando .................... C03B 5/2252 |
| | | | 65/329 |
| 6,119,484 A | * | 9/2000 | Takei .................... C03B 5/1672 |
| | | | 65/134.2 |
| 6,286,337 B1 | * | 9/2001 | Palmquist ............. C03B 5/2252 |
| | | | 65/134.9 |
| 6,318,126 B1 | | 11/2001 | Takei et al. |
| 6,769,272 B2 | | 8/2004 | Roeth et al. |
| 7,032,412 B2 | | 4/2006 | Dorfeld et al. |
| 7,628,038 B2 | | 12/2009 | DeAngelis et al. |
| 7,628,039 B2 | | 12/2009 | DeAngelis et al. |
| 7,681,414 B2 | * | 3/2010 | Pitbladdo ............. C03B 17/064 |
| | | | 65/158 |
| 7,735,340 B2 | | 6/2010 | Burdette et al. |
| 8,375,747 B2 | | 2/2013 | De Angelis et al. |
| 8,607,591 B2 | | 12/2013 | Lautenschlaeger et al. |
| 9,073,771 B2 | | 7/2015 | Goller et al. |
| 2003/0196453 A1 | | 10/2003 | Roth et al. |
| 2006/0016219 A1 | * | 1/2006 | Pitbladdo ............. C03B 17/064 |
| | | | 65/29.21 |
| 2010/0199721 A1 | | 8/2010 | Antoine et al. |
| 2011/0203321 A1 | | 8/2011 | De Angelis et al. |
| 2012/0013956 A1 | | 1/2012 | Toya |
| 2013/0025323 A1 | | 1/2013 | Lineman et al. |
| 2013/0333420 A1 | | 12/2013 | Goller et al. |

* cited by examiner

GLASS INLET TUBE ENVIRONMENTAL CONTROL

This application claims the benefit of priority under 35 U.S.C. § 365 of International Patent Application Serial No. PCT/US15/52118 filed on Sep. 25, 2015, which claims the benefit of priority to U.S. Provisional Application 62/056,943 filed Sep. 29, 2014 the content of each are incorporated herein by reference in their entirety.

BACKGROUND

A wide variety of devices such as Liquid Crystal Displays (LCDs), smart phones, tablet computers etc. can utilize flat glass sheets. One technique for manufacturing these flat glass sheets is the fusion process. In the fusion process, glass sheets are made by using glass manufacturing vessels that contain precious metals, e.g. platinum or platinum alloys which interface with molten glass. The precious metals are generally considered to be inert in relation to most glasses, and thus should not cause any inclusions in the glass sheets. However, this is not necessarily valid.

For example oxidation reactions can occur at the metal/glass leading to the generation of gaseous inclusions in the molten glass and subsequently the glass sheet. One of the more common oxidation reactions that occurs at the metal/glass interface is the conversion of negatively charged oxygen ions to molecular oxygen caused by the thermal breakdown of water and hydroxyl species in the molten glass. This phenomenon occurs because at the elevated temperatures of glass melting and delivery, a low partial pressure of hydrogen exists in the molten glass. Thus, when hydrogen comes in contact with the precious metal vessel containing the molten glass, the hydrogen rapidly permeates out of the glass manufacturing vessel, depleting the metal/glass interface of hydrogen. For example, for every mole of hydrogen that leaves the glass manufacturing vessel, ½ mole of oxygen is left behind at the glass/metal interface. Thus, as hydrogen leaves the glass manufacturing vessel, the oxygen level or partial pressure of oxygen at the metal/glass interface increases, which leads to the generation of blisters or gaseous inclusions in the molten glass. In addition, there are other reactions which involve the catalyzing or oxidation of other species within the molten glass such as halogens (Cl, F, Br) which can lead to the generation of gaseous inclusions within the molten glass and the resulting glass sheet. Further, there are oxidation reactions which can occur due to electrochemical reactions at the metal/glass interface. These electrochemical reactions can be associated with thermal cells, galvanic cells, high AC or DC current applications and/or grounding situations.

Conventional methods used to address the formation of gaseous inclusions includes the use of arsenic as a fining agent within the fusion process or other glass forming process. Arsenic is among the highest temperature fining agents known, and, when added to the molten glass bath, it allows for $O_2$ release from the glass melt at high melting temperatures (e.g., above 1450° C.). This high temperature $O_2$ release, which aids in the removal of bubbles during the melting and fining stages of glass production results in a glass sheet that is essentially free of gaseous inclusions. Furthermore, any residual oxygen bubbles are reabsorbed by the fining agent due to transition from the reduced to oxidized state on cooling. However, from an environmental point of view it is an undesirable to use arsenic as it is a hazardous material. Additional methods include the use of glass coatings as well as DC protection. There is, however, a need in the art to provide an improved method of addressing gaseous inclusions in a glass forming process.

SUMMARY

The present disclosure generally relates to a glass manufacturing system and a system and method for controlling an environment around an inlet tube in the glass manufacturing system.

In some embodiments a system for controlling an environment around an inlet tube (having an inlet body, an input opening, and an output opening) in a glass manufacturing system is provided. The system comprises an electrical heating unit encompassing at least a portion of the inlet tube and having a gas inlet unit and a gas outlet unit each passing therethrough, a first seal proximate the input opening and intermediate an exterior of the inlet body and the electrical heating unit, and a second seal proximate the output opening and intermediate the exterior of the inlet body and the electrical heating unit. The system also comprises a refractory tower encompassing the electrical heating unit and having the gas inlet unit and the gas outlet unit each passing therethrough and a control system that directs a humid gas mixture into the gas inlet unit such that the humid gas mixture flows over the inlet body and exits the refractory tower and the electrical heating unit via the gas outlet unit. The system has an advantage in that it can effectively suppress the formation of gaseous inclusions in molten glass that flows through the inlet tube.

In other embodiments, a method for controlling an environment around an inlet tube (having an inlet body, an input opening, and an output opening) in a glass manufacturing system is provided. The method comprises providing an electrical heating unit encompassing at least a portion of the inlet tube and having a gas inlet unit and a gas outlet unit each passing therethrough, installing a first seal proximate the input opening and intermediate an exterior of the inlet body and the electrical heating unit, and installing a second seal proximate the output opening and intermediate the exterior of the inlet body and the electrical heating unit. The method also includes providing a refractory tower encompassing the electrical heating unit and having the gas inlet unit and the gas outlet unit each passing therethrough and providing a control system that directs a humid gas mixture into the gas inlet unit such that the humid gas mixture flows over the inlet body and exits the refractory tower and the electrical heating unit via the gas outlet unit. The method has an advantage in that it can effectively suppress the formation of gaseous inclusions in molten glass that flows through the inlet tube.

In yet other embodiments, a glass manufacturing system is provided which comprises an inlet tube, a forming vessel, and a plurality of heating elements, wherein the inlet tube receives molten glass, the forming vessel receives the molten glass from the inlet tube and forms a glass sheet, and the heating elements emit heat around the forming vessel. The glass manufacturing system further comprises a system for controlling an environment around the inlet tube which comprises an inlet body, an input opening, and an output opening. The system can comprise an electrical heating unit encompassing at least a portion of the inlet tube and having a gas inlet unit and a gas outlet unit each passing therethrough, a first seal proximate the input opening and intermediate an exterior of the inlet body and the electrical heating unit, and a second seal proximate the output opening and intermediate the exterior of the inlet body and the electrical heating unit. The system can also comprise a refractory tower encompassing the electrical heating unit and having the gas inlet unit and the gas outlet unit each passing therethrough, and a control system that directs a humid gas mixture into the gas inlet unit such that the humid gas mixture flows over the inlet body and exits the refractory tower and the electrical heating unit via the gas outlet unit. The glass manufacturing system has an advantage in that it can effectively suppress the formation of gaseous inclusions in molten glass that flows through the inlet tube.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals where possible and in which.

DETAILED DESCRIPTION

Some embodiments of the present disclosure use a humidity controlled enclosure that surrounds one or more of precious metal-containing glass manufacturing vessels in a glass manufacturing system and can be used to control the partial pressure of hydrogen outside the vessel(s) to reduce the formation of gaseous inclusions in glass sheets. Exemplary humidity controlled enclosures are discussed in U.S. Pat. No. 5,785,726 and U.S. Pat. No. 7,628,039, the contents of each are incorporated by reference herein. It should be noted that while reference may be made to fusion forming processes herein, the claims appended herewith should not be so limited as the embodiments described and claimed are applicable to any type of glass manufacturing system including slot draw, double fusion and float glass manufacturing systems.

Figure 1:
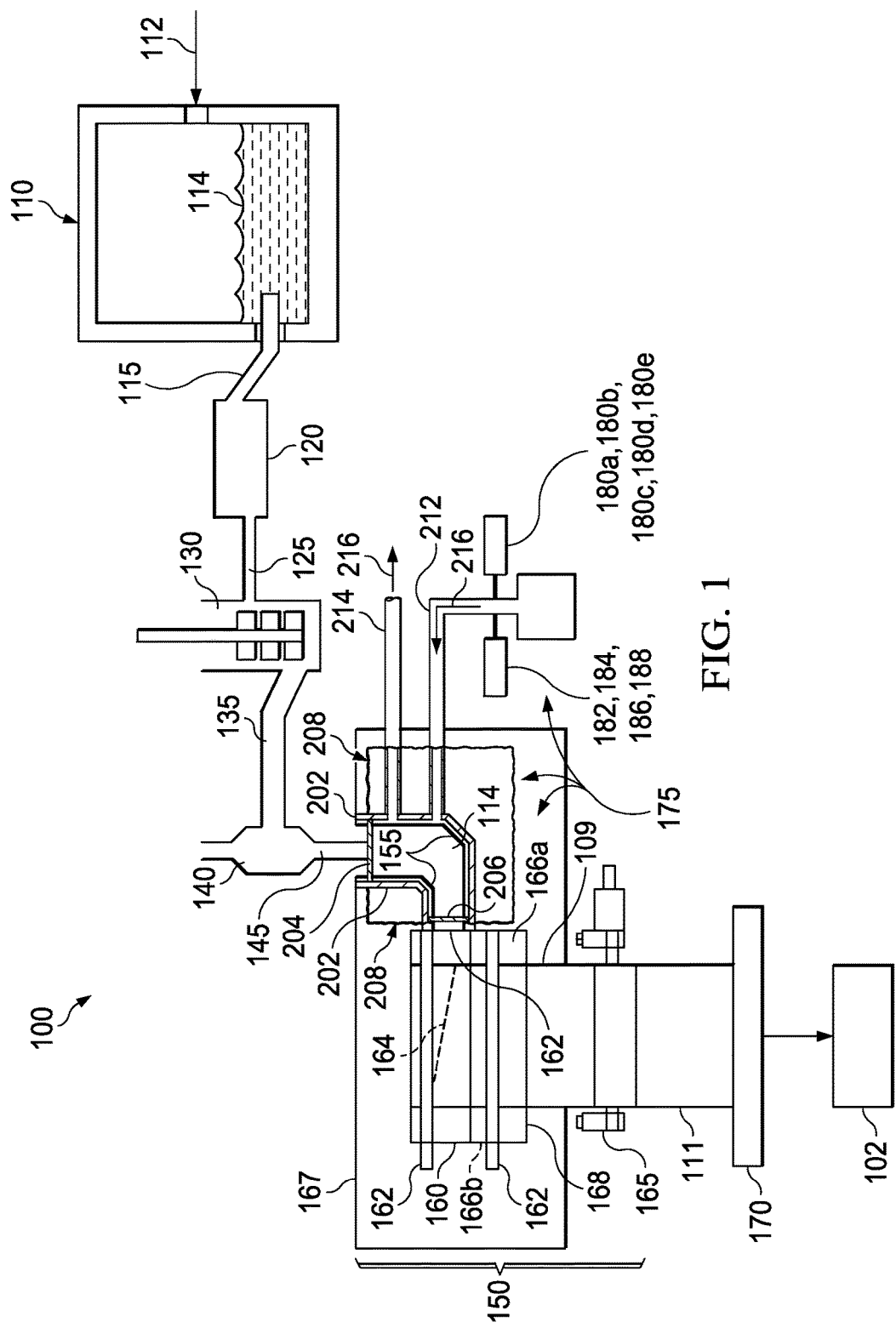
FIG. 1 is a schematic view of an exemplary glass manufacturing system.

Referring to FIG. 1, a schematic view of an exemplary glass manufacturing system 100 is provided for a glass forming process to manufacture a glass sheet 102. The glass forming process may be a down draw or slot draw fusion forming process or may also be a double fusion or float glass forming process. In an exemplary and non-limiting embodiment, the glass manufacturing system 100 may be a fusion forming process and include a melting vessel 110, a melting to fining tube 115, a fining vessel 120, a finer to stir chamber tube 125, a stir chamber 130 (e.g., mixing vessel 130), a stir chamber to bowl connecting tube 135, a bowl 140 (e.g., delivery vessel 140), a downcomer 145, a fusion draw machine (FDM) 150 (which includes an inlet tube 155, a forming vessel 160, multiple heating elements 162, a pull roll assembly 165, and a muffle frame 167), and a traveling anvil machine (TAM) 170. The glass manufacturing vessels 115, 120, 125, 130, 135, 140, 145 and 155 can be made from platinum or platinum-containing metals such as platinum-rhodium, platinum-iridium and combinations thereof, but they may also comprise other refractory metals such as palladium, rhenium, ruthenium, and osmium, or alloys thereof. The forming vessel 160 (e.g., isopipe 160) can be made from a ceramic material or glass-ceramic refractory material.

Glass batch materials can be introduced into the melting vessel 110 as shown by arrow 112 and melted to form molten glass 114. The fining vessel 120 (e.g., finer tube 120) is connected to the melting vessel 110 by the melting to fining tube 115. The fining vessel 120 has a high temperature processing area that receives the molten glass 114 (not shown at this point) from the melting vessel 110 and in which bubbles are removed from the molten glass 114. The fining vessel 120 is connected to the stir chamber 130 by the finer to stir chamber connecting tube 125. The stir chamber 130 is connected to the bowl 140 by the stir chamber to bowl connecting tube 135. The bowl 140 delivers the molten glass 114 (not shown) through the downcomer 145 into the FDM 150.

The FDM 150 includes the inlet tube 155, the forming vessel 160, the heating elements 162, the pull roll assembly 165, and the muffle frame 167. The inlet tube 155 receives the molten glass 114 from the downcomer 145 and from the inlet tube 155 the molten glass 114 (not shown) then flows to the forming vessel 160. The forming vessel 160 includes an opening 162 that receives the molten glass 114 (not shown) which flows into a trough 164 and then overflows and runs down two opposing sides 166a and 166b before fusing together at a root 168 to form a glass sheet 109. In some embodiments, the molten glass has a viscosity in range of 14,000 poise to 75,000 poise. Further, the molten glass can be non-alkaline molten glass or alkaline molten glass. The heating elements 162 (e.g., globar heating elements 162, SiC heating elements 162) emit heat around the forming vessel 160. In this example, two heating elements 162 are located on each side of the forming vessel 160 (e.g., isopipe) whereby one or more heating elements 162 can be utilized to emit heat around the forming vessel 160. The muffle frame 167 encloses the inlet tube 155, the forming vessel 160, and the heating elements 162 and has an opening at the bottom thereof which permits the downward moving glass sheet 109 to pass therethrough. The pull roll assembly 165 receives the glass sheet 109 and outputs a drawn glass sheet 111. The TAM 170 receives the drawn glass sheet 111 and separates the drawn glass sheet 111 into individual glass sheets 102.

In some embodiments, a system 175 (cross-sectional side view is shown) may be provided to control an environment around the inlet tube 155 by heating the inlet tube 155 and providing a humid gas mixture 216 which helps to suppress hydrogen permeation blistering within the molten glass 114 flowing through the inlet tube 155. Further, the system 175 can be employed to prevent or mitigate the humid gas mixture 216 from being directed towards the forming vessel 160 and the heating elements 162 to mitigate or eliminate any resistance decay rate of the heating elements 162. Moreover, an exemplary system 175 can be used to prevent or mitigate the dry air flowing in the muffle frame 167 from flowing over the inlet tube 155.

Figure 2:
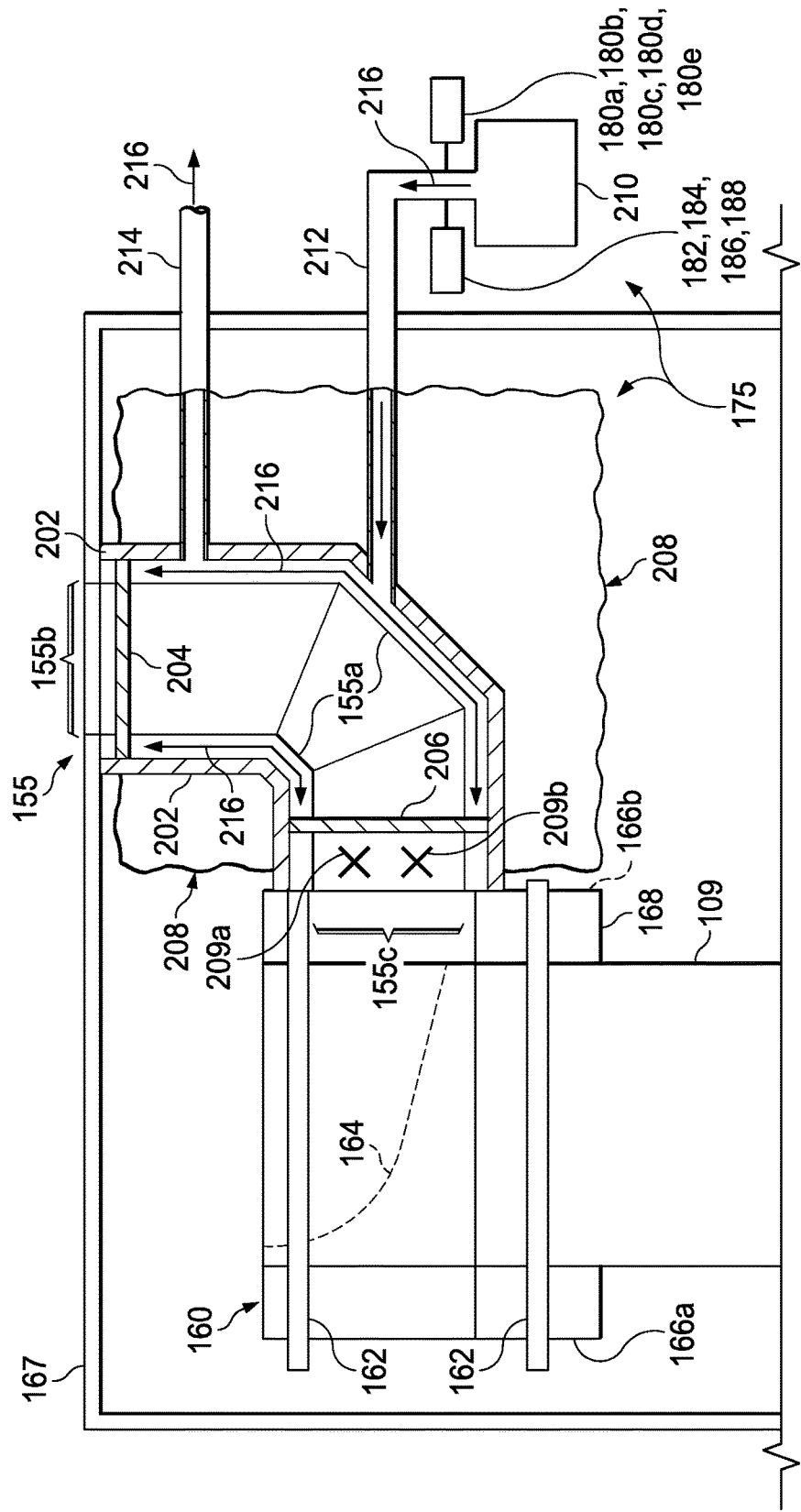
FIG. 2 is a schematic view of an exemplary environmental control system according to some embodiments.

Referring to FIG. 2, a schematic view of an exemplary system 175 (cross-sectional side view) is shown having an inlet tube 155 (cross-sectional side view), the forming vessel 160 (side view) and heating elements 162 (side view) enclosed by the muffle frame 167 (cross-sectional side view). In some embodiments the system 175 can be used to control temperature and humidity around the inlet tube 155 which has an inlet body 155a, an input opening 155b, and an output opening 155c. The system 175 can, in some embodiments, comprise one or more electrical heating units 202, a first seal 204, a second seal 206, a refractory tower 208, one or more thermocouples 209a and 209b, and a control system 210. The electrical heating unit 202 can encompass all or a portion of the inlet tube 155 and can include electrical windings located a predetermined distance from the inlet tube 155 and which can function to heat the inlet tube 155. In some embodiments, the electrical heating unit 202 can include a gas inlet unit 212 and a gas outlet unit 214 each passing therethrough. The first seal 204 may be proximate the input opening 155b and intermediate an exterior of the inlet body 155a and the electrical heating unit 202. The second seal 206 may be proximate the output opening 155c and intermediate an exterior of the inlet body 155a and the electrical heating unit 202. One or more thermocouples 209a and 209b may be proximate the inlet body 155a and intermediate the output opening 155c and the second seal 206. The refractory tower 208 can encompass the electrical heating unit 202 and can have the gas inlet unit 212 and the gas outlet unit 214 each passing therethrough. The control system 210 can be used to direct the humid gas mixture 216 into the gas inlet unit 212 such that the humid gas mixture 216 flows over the inlet body 155a of the inlet tube 155 and exits the refractory tower 208 and the electrical heating unit 202 via the gas outlet unit 214.

Figure 3:
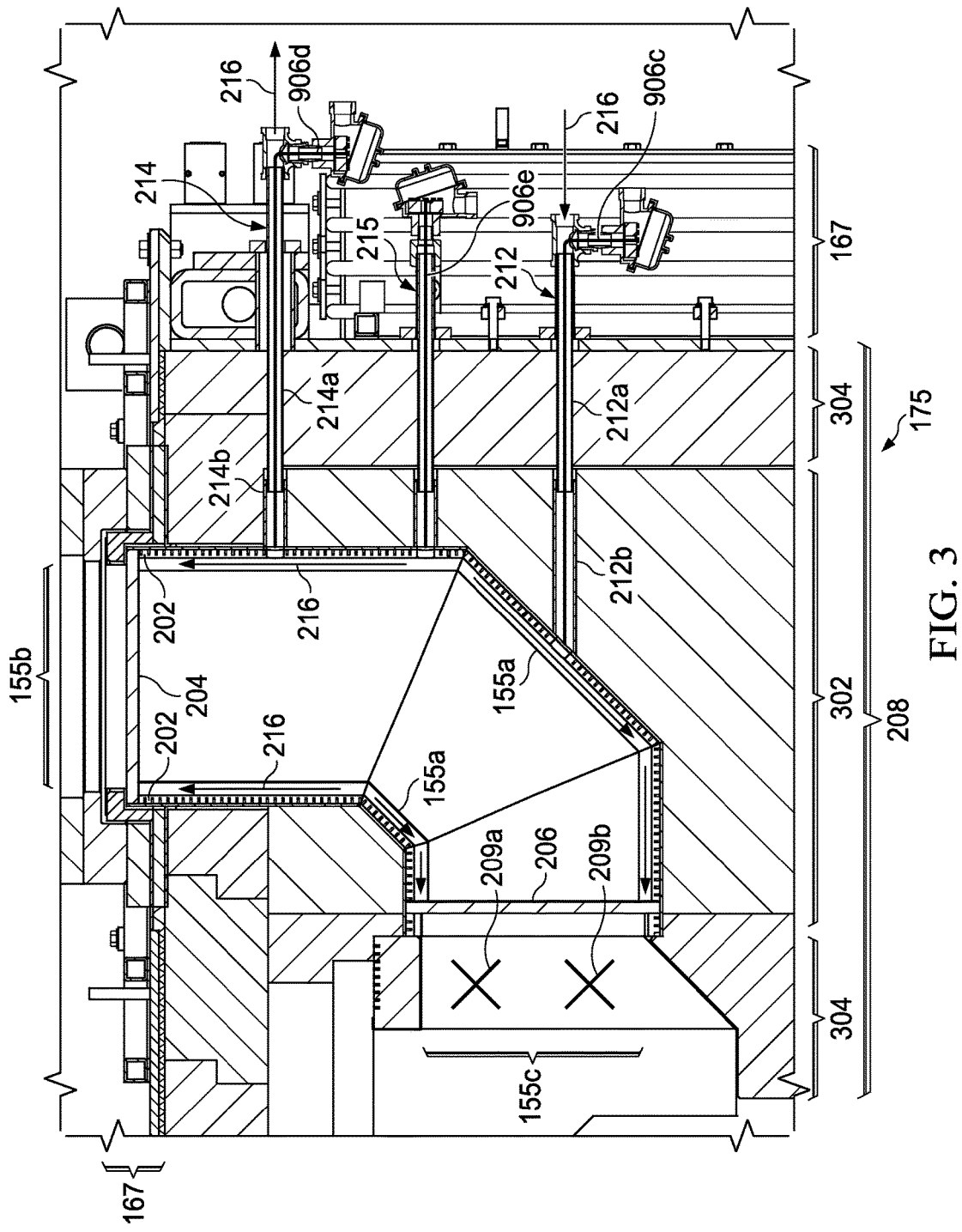
FIG. 3 is cross-sectional side view of a portion of the system shown in FIG. 2.

Referring to FIG. 3, a more detailed cross-sectional side view of the system 175 is shown whereby an inlet tube 155 can be encompassed by the electrical heating unit 202 and located a predetermined distance from the electrical heating unit 202. The first seal 204 can be proximate the input opening 155b of the inlet tube 155 and intermediate an exterior of the inlet body 155a of the inlet tube 155 and the electrical heating unit 202. The second seal 206 can be proximate the output opening 155c of the inlet tube 155 and intermediate an exterior of the inlet body 155a of the inlet tube 155 and the electrical heating unit 202. In this depicted embodiment, the first seal 204 and the second seal 206 each comprise a mixture of a fiber material (e.g., Durablanket® ceramic fiber) and cement.

In some embodiments, the electrical heating unit 202 can be encompassed by the refractory tower 208. In this depicted embodiment, the refractory tower 208 comprises brick and mortar 302 and insulation 304 (e.g., IFB-2800LI) or another suitable material. The insulation 304 can be proximate to and encompass the brick and mortar 302 such that the brick and mortar 302 are proximate the electrical heating unit 202 and intermediate the insulation 304 and the electrical heating unit 202. In some embodiments the gas inlet unit 212 and the gas outlet unit 214 can pass through the refractory tower 208. In this non-limiting embodiment, the gas inlet unit 212 can include a relatively small tube 212a (e.g., 0.688" outer diameter×0.5" inner diameter or any other suitable diameters) passing through the insulation 304 and having one end that fits within a relatively large tube 212b (e.g., 1" outer diameter×0.75" inner diameter or any other suitable diameters) passing through the brick and mortar 302 and the electrical heating unit 202. Likewise, the gas outlet unit 214 includes a similar or different small tube 214a passing through the insulation 304 and one end that fits within a similar or different large tube 214b passing through the brick and mortar 302 and the electrical heating unit 202. In some embodiments the gas inlet unit 212 and gas outlet unit 214 can each have respective thermocouple wires 906c, 906d routed therein. In other embodiments, additional thermocouple wires 906e can be routed in a sealed tube 215 between the gas inlet unit 212 and the gas outlet unit 214.

In other embodiments the humid gas mixture 216 first passes through the gas inlet unit 212 and flows over the inlet body 155a of the inlet tube 155. The humid gas mixture 216 may then exit through the gas outlet unit 214. The gas inlet unit 212 (tubes 212a and 212b) and the gas outlet unit 214 (tubes 214a and 214b) can help minimize the humid gas mixture 216 from escaping the refractory tower 208 (e.g., between the brick and mortar 208a and insulation 208b) to reach the heating elements 162 (see FIG. 2). The first seal 204 and the second seal 206 can help maintain the humid gas mixture 216 around the exterior of the inlet body 155a of the inlet tube 155. Additionally, the second seal 206 can help prevent the humid gas mixture 216 from flowing into the muffle frame 167 and interacting with the heating elements 162 (see FIG. 2) and, the second seal 206 can act to prevent any dry air flowing in the muffle frame 167 from flowing over the inlet body 155a of the inlet tube 155. By stopping the flow of the humid gas mixture 216, the first seal 204 can increase the air pressure within the space between the inlet tube 155 and the electrical heating unit 202 to reduce or eliminate any pressure drop so that dry air is less likely to be drawn up from the muffle frame 167 to flow over the inlet tube 155. Furthermore, with thermocouples 209a and 209b being located between the output opening 155c of the inlet tube 155 and the second seal 204 reducing or eliminating the sensitivity of the sealing around the opening and tube, dry air from the muffle frame 167 can be prevented from flowing over the inlet tube 155 by the second seal 204.

Figure 4:
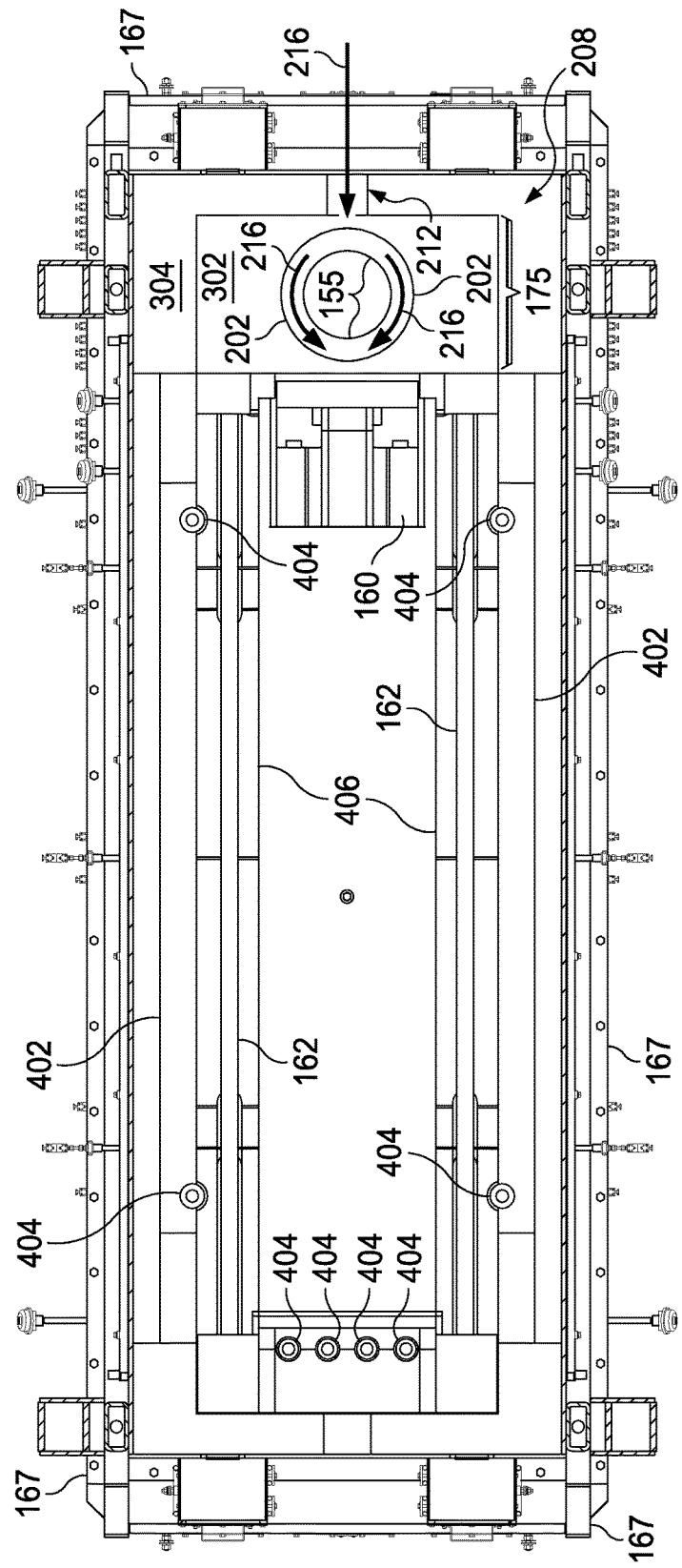
FIG. 4 is a cross-sectional top view of a portion of the system shown in FIG. 2.

Referring to FIG. 4, a detailed cross-sectional top view of a portion of the exemplary system 175, the inlet tube 155, the forming vessel 160 and the heating elements 162 is provided. The system 175, the inlet tube 155, the forming vessel 160, the heating elements 162, and the muffle frame 167 have been described above with respect to FIGS. 1-3. Further, the muffle frame 167 includes a refractory 402 which functions to regulate the heat loss from the forming vessel 160 to the outside environment. The muffle frame 167 includes vertically oriented heating elements 404 which function to emit heat to reduce heat loss during various stages of the glass manufacturing cycle. In addition, the muffle frame 167 includes a housing 406 which functions to protect the forming vessel 160 from particulates which may fall from or off of the heating elements 162 or the refractory 402 and deposit on the glass surface.

Figure 5:
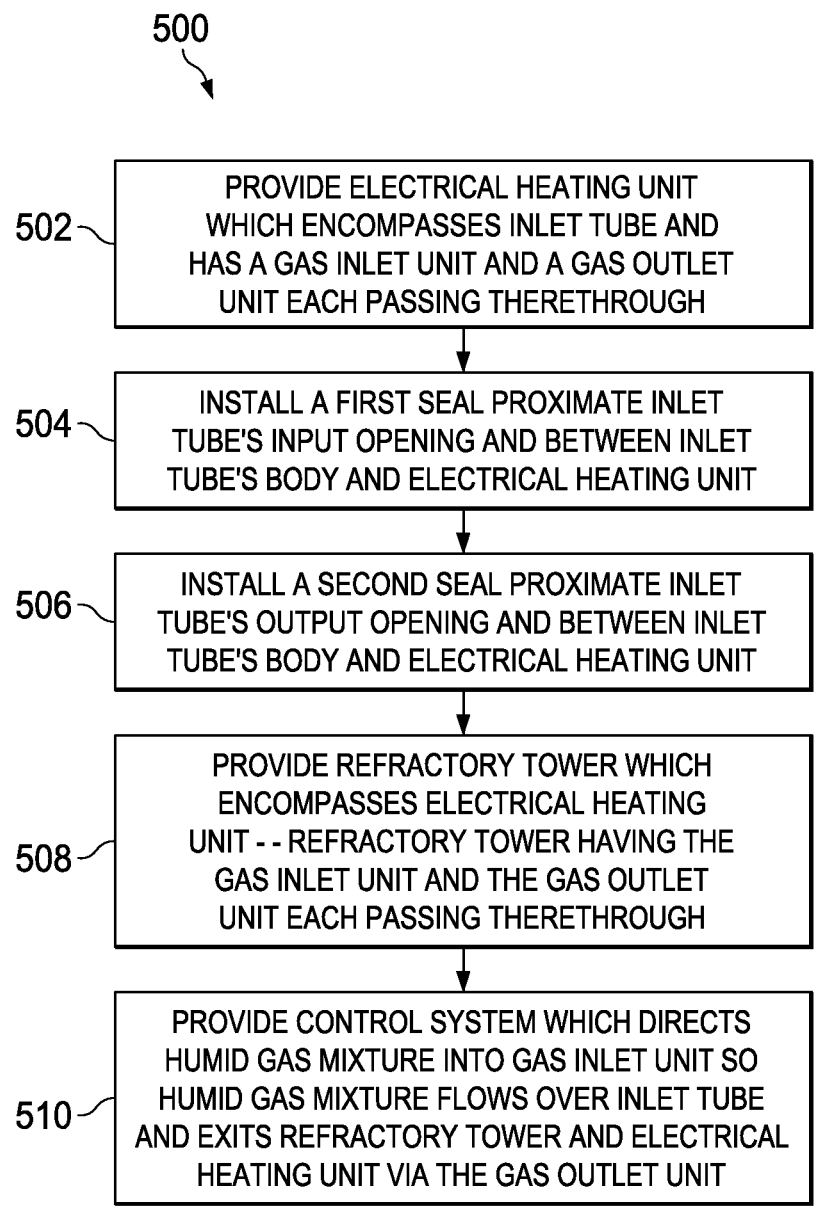
FIG. 5 is a flowchart illustrating an exemplary method according to some embodiments of the present disclosure.

Referring to FIG. 5, a flowchart illustrating an exemplary method 500 according to some embodiments of the present disclosure is provided. The method 500 can comprises providing the electrical heating unit 202 encompassing all or a portion of the inlet body 155a with the gas inlet unit 212 and the gas outlet unit 214 passing therethrough (step 502) and installing the first seal 204 proximate the input opening 155b and intermediate an exterior of the inlet body 155a and the electrical heating unit 202 (step 504). The method also includes installing the second seal 206 proximate the output opening 155c and intermediate the exterior of the inlet body 155a and the electrical heating unit 202 (step 506) and providing the refractory tower 208 encompassing the electrical heating unit 202 and having the gas inlet unit 212 and the gas outlet unit 214 passing therethrough (step 508). In additional embodiments, the method includes providing the control system 210 which directs the humid gas mixture 216 into the gas inlet unit 212 such that the humid gas mixture 216 flows over the inlet body 155a and exits the refractory tower 208 and the electrical heating unit 202 via the gas outlet unit 214 (step 510). Such an exemplary method 500 can suppress hydrogen permeation blistering within the molten glass 114 flowing through the inlet tube 155.

As noted above, an exemplary control system 210 can generate an appropriate humid gas mixture 216 to suppress hydrogen permeation blistering within the molten glass 114 flowing through the inlet tube 155. The control system 210 may connect to one or more sensors 180a, 180b, 180c, 180d and 180e (e.g., flow sensor 180a, dew point/humidity sensor 180b, temperature sensor 180c, oxygen sensor 180d, and pressure sensor 180e) that obtain sensor readings from locations within the gas inlet unit 212 and the external environment (e.g., processing facility). The control system 210 may process the sensor measurements and control different devices like a humidity feed system 182, a heating/cooling control system 184, an air handler 186 (which has access to air and steam), and an $O_2/N_2$ makeup system 188. All of the devices 182, 184, 186 and 188 can be connected to the gas inlet unit 212. The control system 210 can interface with the sensors 180a, 180b, 180c, 180d and 180e and control the devices 182, 184, 186 and 188 to create an environment/atmosphere (humid gas mixture 216) around the exterior of the inlet tube 155 satisfying any number of conditions. In some embodiments, the control system 210 can be configured to control a level of hydrogen within the humid gas mixture 216 to maintain a partial pressure at or greater than a level defined by an equilibrium relationship $pH_2$ (ppm)$=78,000 \times e^{[(-58,900+13.1\ T)/(1.987*T(°\ K))]}$ around the inlet body 155a of the inlet tube 155. In other embodiments, the control system 210 can be configured to control the humid gas mixture 216 such that there is up to 38,000 ppm of hydrogen at the exterior of the inlet tube 155. In additional embodiments, the control system 210 can be configured to control the humid gas mixture 216 such that it is maintained at a dew point temperature of 200° F. or lower. In further embodiments, the control system 210 can be configured to control the humid gas mixture 216 such that it has an oxygen content with a level of less than 21% by volume, configured to control the humid gas mixture 216 such that it has an oxygen level of 0.01% to 1% by volume and a water vapor level of 2% to 20% by volume, with the balance being essentially an inert gas; and/or configured to control the humid gas mixture 216 such that it includes cracked ammonia products or combustion products.

An exemplary control system 210 and the functional operations provided thereby can be implemented in digital electronic circuitry, or in computer software, firmware, or hardware, including the structures disclosed in this specification and their structural equivalents, or in combinations of one or more of them. Embodiments described herein can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine readable storage substrate, a memory device, or a combination of one or more of them.

The term "processor" or "controller" can encompass all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few.

Computer readable media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments described herein can be implemented on a computer having a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for example, input from the user can be received in any form, including acoustic, speech, or tactile input.

Embodiments described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described herein, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

There has been described a system 175 and method 500 to control an environment around the inlet tube 155 in a glass manufacturing system. In some embodiments, the system 175 and method 500 described herein can enclose the inlet tube 155 in an FDM 150 (in non-limiting embodiments directed to a fusion system) and can enable a humid gas mixture 216 to flow over the exterior of the inlet tube 155 and away from the other components (e.g., globar heating elements 162) located within the muffle frame 167. The system 175 and method 500 are a marked improvement over technology where air flow that traveled up the FDM 150 from convection or was blown in to the muffle frame 167 to control the thickness of the glass sheet 102 would exit up and flow around the inlet tube 155. Such a configuration was undesirable as thickness control air is dry air that increases hydrogen permeation and blisters in molten glass. Further, this could result in humidifying the entire cavity in the muffle frame 167 reducing the performance of the heating elements 162 where the humid air reacted with the heating elements 162 thinning the elements in sections resulting in a rapid increase in resistance causing localized hot spots and impacting glass flow distribution and thickness management. Any early failure of heating elements 162 as a result of such thinning can also generate a thermal upset causing a loss of glass production and potential for material failure. The described system 175 and method 500, however, addresses these problems and can create local pressurization of the inlet tube 155 to reduce onclusions on the glass sheets 102 by retarding any upward convection into the muffle frame 167 to reduce the size and number of particulates that can deposit on the glass sheets 102. Further, an exemplary system 175 and method 500 can provide a seal 206 around the inlet tube 155 to isolate dry air from inside the FDM 150. It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a component" includes examples having two or more such components unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. Moreover, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A system for controlling an environment around an inlet tube in a glass manufacturing system, wherein the inlet tube comprises an inlet body, an input opening, and an output opening, said system comprising:
   an electrical heating unit encompassing at least a portion of the inlet tube and having a gas inlet unit and a gas outlet unit each passing therethrough;
   a first seal proximate the input opening and intermediate an exterior of the inlet body and the electrical heating unit;

a second seal proximate the output opening and intermediate the exterior of the inlet body and the electrical heating unit;
a refractory tower encompassing the electrical heating unit and having the gas inlet unit and the gas outlet unit each passing therethrough; and,
a control system that directs a humid gas mixture into the gas inlet unit such that the humid gas mixture flows over the inlet body and exits the refractory tower and the electrical heating unit via the gas outlet unit.

2. The system of claim 1, wherein said inlet tube includes a metal selected from platinum, platinum-containing metals including platinum-rhodium, platinum-iridium and combinations thereof, or refractory metals including palladium, rhenium, ruthenium, and osmium, or alloys thereof.

3. The system of claim 1, wherein the control system is configured to control a level of hydrogen within the humid gas mixture so that a partial pressure is maintained at or greater than a level defined by an equilibrium relationship $pH_2$ (ppm)$=78,000 \times e^{\wedge[(-58,900+13.1\ T)/(1.987*T(°\ K))]}$ around the inlet body of the inlet tube.

4. The system of claim 1, wherein:
the inlet tube receives molten glass from a downcomer in the glass manufacturing system;
the inlet tube outputs the molten glass to a forming vessel in the glass manufacturing system; and,
the second seal prevents or mitigates the humid gas mix from being directed towards the forming vessel and a plurality of heating elements which emit heat around the forming vessel.

5. The system of claim 4, wherein the molten glass has a viscosity in range of 14,000 poise to 75,000 poise.

6. The system of claim 4, wherein the molten glass is non-alkaline molten glass or alkaline molten glass.

7. A method for controlling an environment around an inlet tube in a glass manufacturing system, wherein the inlet tube comprises an inlet body, an input opening, and an output opening, said method comprising:
providing an electrical heating unit encompassing at least a portion of the inlet tube and having a gas inlet unit and a gas outlet unit each passing therethrough;
installing a first seal proximate the input opening and intermediate an exterior of the inlet body and the electrical heating unit;
installing a second seal proximate the output opening and intermediate the exterior of the inlet body and the electrical heating unit;
providing a refractory tower encompassing the electrical heating unit and having the gas inlet unit and the gas outlet unit each passing therethrough; and,
providing a control system that directs a humid gas mixture into the gas inlet unit such that the humid gas mixture flows over the inlet body and exits the refractory tower and the electrical heating unit via the gas outlet unit.

8. The method of claim 7, wherein said inlet tube include a metal selected from platinum, platinum-containing metals including platinum-rhodium, platinum-iridium and combinations thereof, or refractory metals including palladium, rhenium, ruthenium, and osmium, or alloys thereof.

9. The method of claim 7, further comprising the step of controlling a level of hydrogen within the humid gas mixture to maintain a partial pressure at or greater than a level defined by an equilibrium relationship $pH_2$ (ppm)$=78,000 \times e^{\wedge[(-58,900+13.1\ T)/(1.987*T(°\ K))]}$ around the inlet body of the inlet tube.

10. The method of claim 7, further comprising the steps of:
receiving molten glass from a downcomer in the glass manufacturing system;
outputting the molten glass to a forming vessel in the glass manufacturing system;
and,
mitigating the humid gas mix from being directed towards the forming vessel and a plurality of heating elements which emit heat around the forming vessel.

11. The method of claim 10, wherein the molten glass has a viscosity in range of 14,000 poise to 75,000 poise.

12. The method of claim 10, wherein the molten glass is non-alkaline molten glass or alkaline molten glass.

13. A glass manufacturing system comprising:
an inlet tube, a forming vessel, and a plurality of heating elements, wherein the inlet tube receives molten glass, the forming vessel receives molten glass from the inlet tube and forms a glass sheet, and the heating elements emit heat around the forming vessel; and
a system for controlling an environment around the inlet tube which comprises an inlet body, an input opening, and an output opening, said system comprising:
an electrical heating unit encompassing at least a portion of the inlet tube and having a gas inlet unit and a gas outlet unit each passing therethrough;
a first seal proximate the input opening and intermediate an exterior of the inlet body and the electrical heating unit;
a second seal proximate the output opening and intermediate the exterior of the inlet body and the electrical heating unit;
a refractory tower encompassing the electrical heating unit and having the gas inlet unit and the gas outlet unit each passing therethrough; and,
a control system that directs a humid gas mixture into the gas inlet unit such that the humid gas mixture flows over the inlet body and exits the refractory tower and the electrical heating unit via the gas outlet unit.

14. The glass manufacturing system of claim 13, wherein said inlet tube includes a metal selected from platinum, platinum-containing metals including platinum-rhodium, platinum-iridium and combinations thereof, or refractory metals including palladium, rhenium, ruthenium, and osmium, or alloys thereof.

15. The glass manufacturing system of claim 13, wherein the control system is configured to control a level of hydrogen within the humid gas mixture so that a partial pressure is maintained at or greater than a level defined by an equilibrium relationship $pH_2$ (ppm)$=78,000 \times e^{\wedge[(-58,900+13.1\ T)/(1.987*T(°\ K))]}$ around the inlet body of the inlet tube.

16. The glass manufacturing system of claim 13, wherein the molten glass has a viscosity in range of 14,000 poise to 75,000 poise.

17. The glass manufacturing system of claim 13, wherein the molten glass is non-alkaline molten glass or alkaline molten glass.

* * * * *